United States Patent [19]

Zylka

[11] Patent Number: 4,674,003

[45] Date of Patent: Jun. 16, 1987

[54] ELECTRONIC HIGH-VOLTAGE GENERATOR FOR ELECTROSTATIC SPRAYER DEVICES

[75] Inventor: Hans-Joachim Zylka, Azmoos, Switzerland

[73] Assignee: J. Wagner AG, Switzerland

[21] Appl. No.: 719,466

[22] Filed: Apr. 3, 1985

[30] Foreign Application Priority Data

Apr. 3, 1984 [DE] Fed. Rep. of Germany ....... 3416093

[51] Int. Cl.[4] ................................................ H02H 3/08

[52] U.S. Cl. ...................................... 361/235; 363/79; 363/95

[58] Field of Search ........................ 361/235, 227, 228; 363/79, 95; 364/481; 323/903; 55/105

[56] References Cited

U.S. PATENT DOCUMENTS 3,893,828 7/1975 Archer ............................. 55/105 X
3,984,215 10/1976 Zucker ............................ 323/903 X
4,158,163 6/1979 Eriksen et al. .................... 363/79 X
4,485,427 11/1984 Woodruff et al. .................. 361/235

FOREIGN PATENT DOCUMENTS 163273 9/1983 Japan .................................... 363/95

*Primary Examiner*—L. T. Hix
*Assistant Examiner*—D. Rutledge

[57] ABSTRACT

A high-voltage generator for electrostatic sprayer devices includes a frequency-clocked power amplifier for feeding the primary of a transformer whose secondary is connected to a high-voltage cascade or multiplier circuit. The power amplifier is connected to a controllable low-voltage d.c. voltage source and to a controllable frequency generator, whereby the control of the d.c. voltage source and of the frequency generator is provided by a microcomputer such that the transformer is optimally matched for all voltages appearing at the high-voltage output of the cascade.

9 Claims, 6 Drawing Figures

CONTROLLED VOLTAGE SOURCE
POWER AMPLIFIER
FREQUENCY GENERATOR
MICROCOMPUTER
PRIMARY VOLTAGE IDENTITY CIRCUIT
PRIMARY CURRENT IDENTITY CIRCUIT
SPRAY CURRENT IDENTITY CIRCUIT
INPUT/OUTPUT CONTROL CIRCUIT
DRIVE UNIT
LOGIC MONITORING CIRCUIT
INTERPROCESSOR INTERFACE CIRCUIT
HIGH-RANKING COMPUTER INTERFACE
10
11
12
13
14
15
16
16a
17
18
19
20
21
22
23
24
25
26
27

ELECTRONIC HIGH-VOLTAGE GENERATOR FOR ELECTROSTATIC SPRAYER DEVICES

BACKGROUND OF THE INVENTION

1. Field of the Invention

The present invention relates to an electronic high-voltage generator for electrostatic sprayer devices comprising a charging electrode, the sprayer devices being formed of a controllable low-voltage d.c. voltage source, a frequency-clocked power amplifier for converting the d.c. voltage into an alternating voltage, and a transformer for converting the low-voltage alternating voltage into a medium high voltage alternating voltage, and a high-voltage cascade for converting the medium high voltage alternating voltage into a high-voltage d.c. voltage, and particularly for hand spray guns in which the transformer and the cascade are integrated in the gun.

2. Description of the Prior Art

Various embodiments of the type of high-voltage generator generally set forth above are commercially available, and either represent a separate element connected to the spray gun by way of a high-voltage cable or the transformer and the high-voltage cascade or multiplier are accommodated in the gun and are connected by way of a low-voltage line to the unit containing the other components of the high-voltage generator. When producing such sprayer systems, the individual electronic components are designed such, particularly an oscillator having an oscillation frequency for clocking the power amplifier, that the high-voltage generation occurs with the lowest possible power losses, in particular that the transformer functions optimally loss-free (resonant range). Despite this prematching, however, considerable power losses occur in the practical operation of such sprayer systems, particularly because the prematching is necessarily based on fixed values with respect to the connecting line between the high-voltage generator or, respectively, high-voltage generating portion and the spray gun, as well as with respect to the load. It is precisely the load, however, that is dependent on the distance between the charging electrode and the workpiece to be sprayed, the type of sprayed material and the like which is subject, in practice, to considerable changes or, respectively, fluctuations, particularly in the case of hand sprayguns. The consequence of these considerable losses is not only an inefficient operation, but also the requirement to provide for a corresponding heat dissipation, for instance at series resistors. In spray guns wherein the transformer and the high-voltage cascade are accommodated in the gun, a further disadvantage occurs in that, in order to avoid overheating damage, limits are placed on the miniaturization of these components, this leading to the fact that they are relatively large and heavy and, therefore, unwieldy, particularly in the case of hand sprayguns.

SUMMARY OF THE INVENTION

It is therefore the object of the present invention to provide an improved electrostatic high-voltage generator of the type generally set forth above and intended for operation of electrostatic sprayer devices such that an automatic matching in the direction of minimum power losses continuously occurs during practical operation.

According to the invention, the above object is achieved in a generator of the type generally set forth above in that the power amplifier is clocked by a d.c. voltage-controlled, regulatable frequency generator, in that the low-voltage d.c. voltage source and the frequency generator are controlled by a microcomputer such that the transformer is optimally matched with respect to performance for all voltages appearing at the high-voltage output of the cascade, i.e. its primary current therefore remains at the appertaining minimum, and in that the actual values of primary voltage and current of the transformer are continuously supplied as operating data to the microcomputer.

The present invention is based on the perception that the power losses occurring in practice given the known high-voltage generators are particularly based on the fact that the resonant range of the transformer shifts given load changes, i.e. the transformer no longer operates in the optimum power range. In order to then be able to undertake a frequency matching, the possibility must be created of being able to vary the frequency of the power amplifier driving the primary side of the transformer. A controllable frequency generator is therefore employed in accordance with the invention for clocking the power amplifier, namely instead of the standard oscillators oscillating at a specific frequency. The control of this frequency and, in addition, the control of the low-voltage d.c. voltage source then occurs by way of a microcomputer which continuously and constantly undertakes the optimum power-wise matching on the basis of a control algorithm. The voltage at the low-voltage d.c. voltage source and, therefore, the high-voltage at the output of the high-voltage cascade is thereby set and controlled according to a prescribed reference value and the frequency of the frequency generator is optimally selected with respect to power or, respectively, controlled by the computer. As a result of this nearly loss-free high-voltage generation in all operating conditions an energy saving occurs on the one hand, and on the other hand a significant reduction in the heat generated by the electronic components, particularly the transformer, also occurs. Given, for example, the sprayguns having integration of the transformer and the cascade, therefore, it is possible to keep these components extremely small using modern electronics and, therefore, to execute the gun as a small and lightweight device without any risk of overheating of the electronic components.

According to a further feature of the invention, the spray current, i.e. the current flowing between the charging electrode and the workpiece to be sprayed, is identified, whereby the microcomputer then keeps the voltage essentially constant up to a prescribed spray current threshold on the basis of the identified spray current values, but reduces the voltage when this threshold is reached or, respectively, exceeded. In other words, when the gun nears the workpiece, this being connected with an increase in the spraygun, the voltage is first held at an essentially constant value, whereas the voltage is reduced after a specific distance (spray current threshold) and the danger of arcing is thus avoided. Therefore, work can still be carried out free of hazard even within the threshold distance, whereby the optimum matching (minimum loss) continues to be guaranteed. Although so-called proximity switches have already been disclosed, for example, in the European patent application No. 0 092 404, in which the voltage is reduced as a gun approaches the workpiece, these known circuits are relatively involved and are hardly in the position of keeping the voltage constant before the threshold is reached and contribute nothing to a matching of the high-voltage generator accurately given the greatly fluctuating operating conditions in this case. In addition, the identification of the spray current according to the invention occurs and very simple, problem-free and yet accurate measuring method.

According to other features of the invention, the high-voltage generator can be expanded by selection units, control elements and interface units, whereby numerous possibilities derive with respect to inputting and displaying data, prescribing specific sequences and linking with other sprayer devices and/or other data processing devices.

BRIEF DESCRIPTION OF THE DRAWINGS

Other objects, features and advantages of the invention, its organization, construction and operation will be best-understood from the following detailed description, taken in conjunction with the accompanying drawings, on which.

FIGS. *2a* and *2b* are graphic illustrations to aid in explaining the control dependent on spray current; and FIGS. *3a*, *3b* and *3c* are representations of operating conditions as seen on a display unit.

DESCRIPTION OF THE PREFERRED EMBODIMENTS

Figure 1:
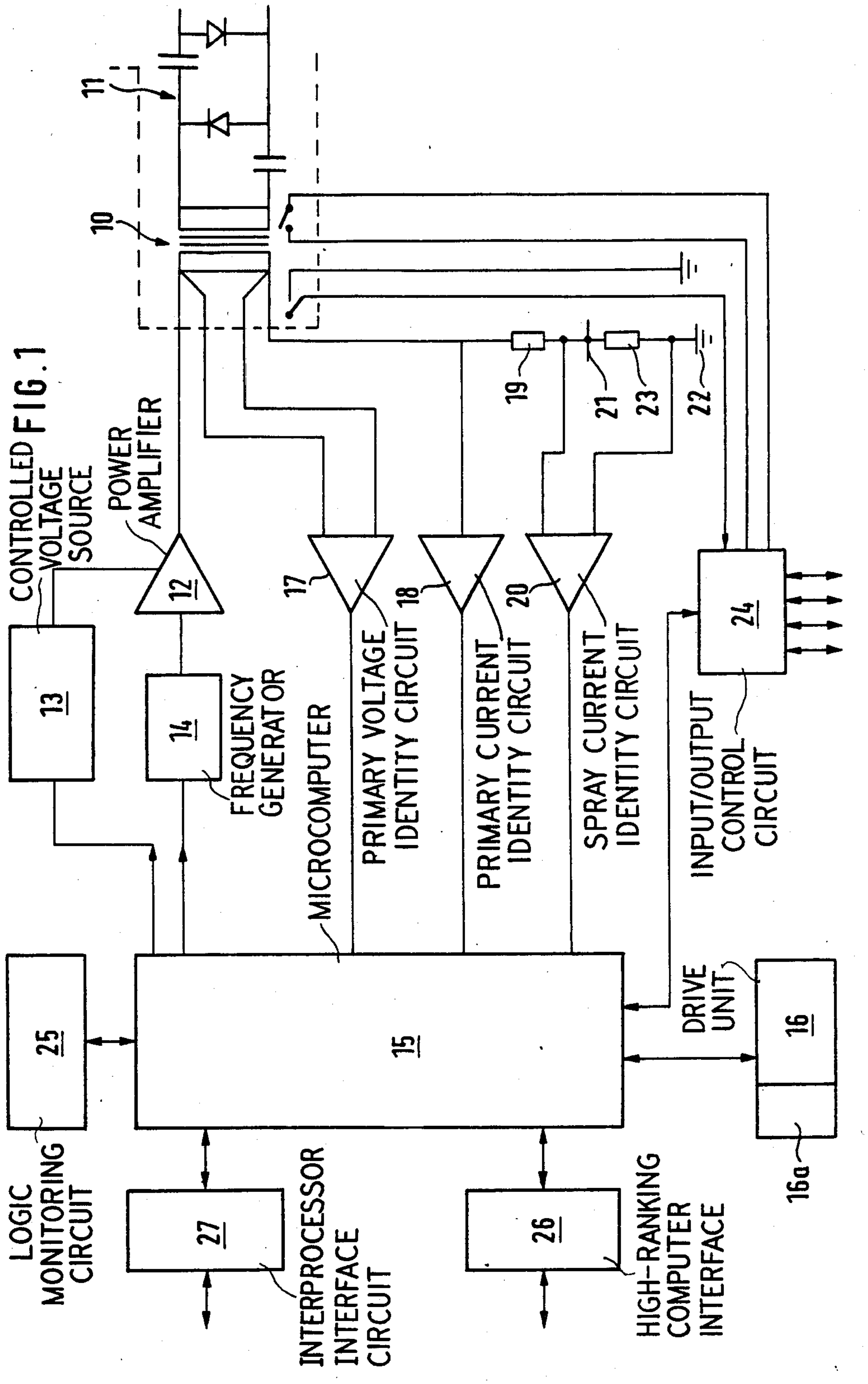
FIG. 1 is a block diagram of an embodiment of a high-voltage generator constructed in accordance with the present invention.
Figure 2A:
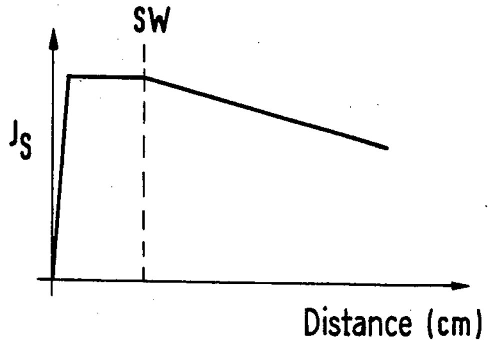
Figure 2B:
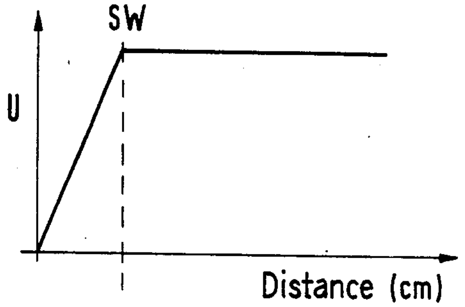
Figure 3A:
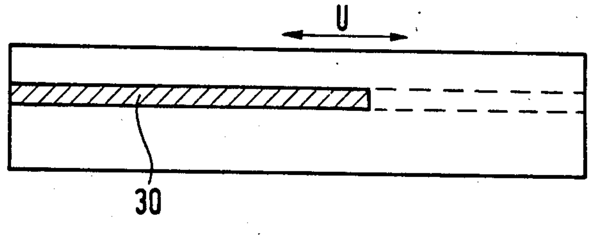
Figure 3B:
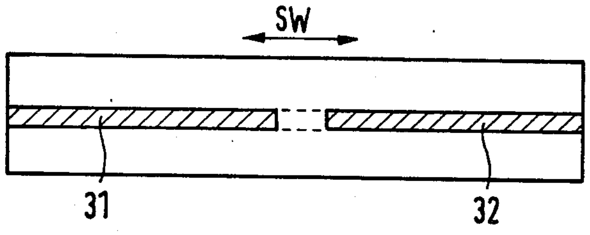
Figure 3C:
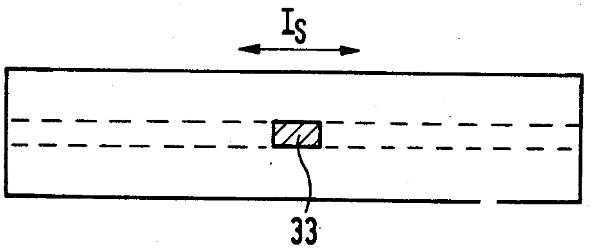

Referring to FIG. 1, a high-voltage transformer 10 is illustrated as having its secondary connected to the input of a high-voltage cascade 11. The high-voltage output of the cascade 11 leads to a high-voltage electrode (not shown) of an electrostatic spray device. The transformer 10, the high-voltage cascade 11 and the high-voltage electrode are standard components of known electrostatic sprayguns having high-voltage generation integrated in the gun.

The primary side of the high-voltage transformer 10 is supplied via a feed cable (not shown but indicated by the schematically illustrated electrical conductors) from a power amplifier 12 which, in the manner of the components discussed below, is located at a location which is remote from the spraygun, preferably in the housing of the combined feed and control unit. The power amplifier 12 is supplied with d.c. voltage from a controllable voltage source 13, for example a clocked power pack. Further, the required clock frequency is impressed on the power amplifier 12 by a frequency generator 14, whereby the frequency generator 14 is a d.c. controlled regulatable frequency generator, this being of essential significance. The voltage source 13 and the frequency generator 14 are connected by way of control lines to a microcomputer 15 which undertakes the control of these two components. The microcomputer 15 is selectable by a drive unit 16 which comprises a manually-actuatable keyboard as well as a display for displaying data of interest. Further, the microcomputer 15 is continuously supplied with data concerning the events occurring in the high-voltage generator, whereby the respective actual voltage values are identified by a circuit 17 and the respective actual current values of the primary side of the transformer 10 are identified by a circuit 18 and are forwarded to the microprocessor 15 as operational data upon appropriate data editing. The circuits of the two units 17 and 19 are thereby shown on the drawing, along with a low-value resistor 19. In addition, the microprocessor 15 is supplied with operational data concerning the magnitude of the spray current, i.e. the current between the high-voltage electrode and the grounded workpiece, this data being supplied by way of a circuit 20. The circuit 20 thereby determines the spray current in such a manner that the current flow between the electronic ground, indicated at 21, and ground 22 is measured, namely upon interposition of a high-value resistor 23. In this manner, the spray current which is difficult to access with direct measurement techniques can be easily and nonetheless accurately identified.

An input/output control circuit 24, which is in communication with the microcomputer 15 and actuation elements of the spraygun, for example the trigger members for high-voltage, spray material feed and compressed air feed, and which controls certain sequences, for example opening of the spray material valve only after the high-voltage has been switched on, and indicates errors under given conditions. A standard monitoring logic circuit 25 assumes the monitoring of the program control of the microcomputer 15. Interface circuits 26 and 27 provide the interfaces between the microcomputer and other units. The interface circuit 26, for example, is an interprocessor interface for producing combinations for the purpose of data or, respectively, instruction exchange (for example controlling a plurality of sprayguns from a central location) and the interface 27 is a serial interface which enables a connection to high-ranking computer systems.

The high-voltage generator operates in the following manner. The operator inputs the value for the high voltage desired at the charging electrode via the keyboard of the drive unit 16. During the entire spraying operation, the microcomputer controls the voltage of the voltage source 13 and the frequency of the generator 14 such that, on the one hand, the primary current of the transformer 10 remains at the most favorable value (minimum) in terms of performance. An optimum spray effect (constant high voltage) and a minimum power loss (optimum matching) are therefore guaranteed regardless of the respective loads and load fluctuations. In addition to the input of the desired high voltage at the charging electrode, however, a spray value threshold is also input into the microcomputer by way of the keyboard. When this threshold is reached or exceeded, this being communicated to the microcomputer 15 by the spray current identity circuit 20, then the microcomputer 15 reduces the voltage at the voltage source 13 and, therefore, the high voltage at the charging electrode, namely such that the spray current then remains essentially constant. FIG. *2a* illustrates the characteristic of the spray current $I_S$ and FIG. *3a* illustrates the characteristic of the high voltage U at the charging electrode, namely respectively entered over the distance of the charging electrode from the workpiece. The broken vertical line in FIG. *2a* indicates the threshold of the spray current or, respectively, of the critical distance. This regulation, as seen from the two diagrams, enables hazard-free work up to minimum distances between the charging electrode and the workpiece, whereby the control can be undertaken such that the voltage completely collapses immediately before the charging electrode contacts the workpiece (contact protection). The power matching thereby also continues to be carried out during this "close operation", i.e.

no significant power losses and, therefore, no heating of the electronics modules occur during this operating condition.

Various settings and operating data can be displayed to the operator on the display unit of the drive unit 16. In particular, a display of the selected voltage, of the selected spray current threshold and of the magnitude of the spray current will be undertaken. A particularly dramatic display for these three values comprises a switchable luminescent diode band such as illustrated in FIGS. *3a*, *3b* and *3c*. The luminescent band 30 in FIG. *3a* represents the display for the high voltage that has been set, whereby the voltage value derives from the length of the band 30. This display will therefore remain constant during operation unless the spray current threshold is exceeded. The condition illustrated in FIG. *3b* in which the set spray current threshold is displayed, namely by the non-illuminated diode dividing the luminescent band 30 into two sub-bands 31, 32 can be achieved by switching. By further switching, finally, the condition of FIG. *3c* is reached, wherein the actual spray current is displayed. Only a single luminescent value 33 is then illuminated for this display of the spray current. The advantage of this display is that only one luminescent diode array is required for displaying three values, namely the voltage U, the threshold SW and the spray current $I_S$.

On the basis of data existing in the microcomputer, information can be derived which are essential for error diagnosis, for example allow identification in the case of an error as to whether it is a matter of a defect of the cascade, a line interruption, etc. Further, both the prescription as well as the recognition or, respectively, display of specific sequences and events can be achieved by way of the input/output control circuit 24, for example the prescription of interlocks (for instance the paint valve is not opened until after the high voltage has been switched on) or the display of errors. Combinations of a plurality of logics can be executed by way of the interprocessor interface circuit 26 for the purpose of data or, respectively, instruction exchange, for example when a plurality of spray guns are to be controlled from a central location or when a workpiece grounding monitor is to be connected, whereby the high voltage then automatically disconnects given deficient workpiece grounding. When the high-voltage generator is to be employed in combination with higher-ranking computers, this can occur by way of the serial interface 27; nearly unlimited possibilities thereby derive for automatic spraying systems with autonomous paint changing and the like.

The programming of the microcomputer amounts to the programming of commercially available microcomputers, including the combination of a microprocessor and a data store, and providing the same with a program including the algorithm control.

By way of a numerical example, it is pointed out that the d.c. voltage source 13 supplies a d.c. voltage of 25 V and a d.c. current of 0.5–2 A and the frequency generator supplies a clock frequency of 26 kHz.

Of course, the present invention is not limited to the exemplary embodiment illustrated and discussed herein, rather numerous modifications thereof are possible without departing from the spirit and scope of the invention. This relates particularly to the type and circuitry of the individual electronic components. What is essential, however, is that the microcomputer controls voltage and current such that an optimum matching is always provided, this, referring to the primary side of the transformer, corresponding to maximum amplitude given minimum current.

As mentioned, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In combination, an electrostatic sprayer device, including actuation elements, and a high-voltage generator, comprising:

a charging electrode in said sprayer device;

a controllable low d.c. voltage source;

a frequency-clocked power amplifier connected to said low d.c. voltage source for converting the low d.c. voltage into a low a.c. voltage;

a transformer including a primary connected to said power amplifier, and a secondary, for transforming the low a.c. voltage into a medium a.c. voltage;

a high-voltage multiplier connected between said transformer and said electrode for converting the medium a.c. voltage into a high d.c. voltage, said multiplier mounted in said sprayer device;

a regulatable frequency generator connected to and operable to provide clock signals to said power amplifier;

a microcomputer including a plurality of data inputs, a plurality of control signal outputs and a stored control algorithm;

said controllable low d.c. voltage source and said frequency generator connnected to respective control signal outputs of said microcomputer and controlled in voltage and frequency, respectively, by said microcomputer to maintain the primary current of said transformer at a minimum for all respective voltages appearing at the output of said multiplier as reflected by control information; and sensing means connected between said primary and said data inputs for continuously providing the control information as data input signals representing actual values of primary voltage and current, whereby said sprayer device is controlled and regulated for a constant electrical charging, independent of the load resulting from varying the distance between the sprayer device and a workpiece and independent of the material being sprayed.

2. The combination of claim 1, wherein:

said sprayer device is a hand-held spraygun, said transformer and said multiplier mounted in said spraygun.

3. The combination of claim 1, wherein:

said sensing means comprises a spray current identification circuit connected to said primary of said transformer for continuously providing a spray current signal representing the spray current between said electrode and ground as a data input signal for said microcomputer to control said low d.c. voltage source to cause the high-voltage at said electrode to remain constant and to reduce that voltage when a predetermined spray current threshold is reached or transgressed.

4. The combination of claim 3, wherein:

said sensing means comprises a voltage divider connected between said primary and conventional ground including means defining a separate electronics ground; and said spray current identification circuit is connected to said voltage divider for measuring the spray current as represented by the current flow between the conventional ground and the electronics ground.

5. The combination of claim 1, and further comprising:

control means connected to said microcomputer, including a keyboard and a display.

6. The combination of claim 5, wherein:

said display comprises a switchable luminescent diode band display.

7. The combination of claim 1, and further comprising:

an input/output control circuit connected to said microcomputer, to said high-voltage transformer and to the actuation elements for controlling the sequence of operation of said sprayer device.

8. The combination of claim 1, and further comprising:

an interface connected to said microcomputer for providing an interprocessor linkage.

9. The combination of claim 1, and further comprising:

an interface connected to said microcomputer for providing a serial linkage.

* * * * *